March 17, 1936. W. STAHLECKER 2,034,670
FLOATING BEARING
Filed May 9, 1934
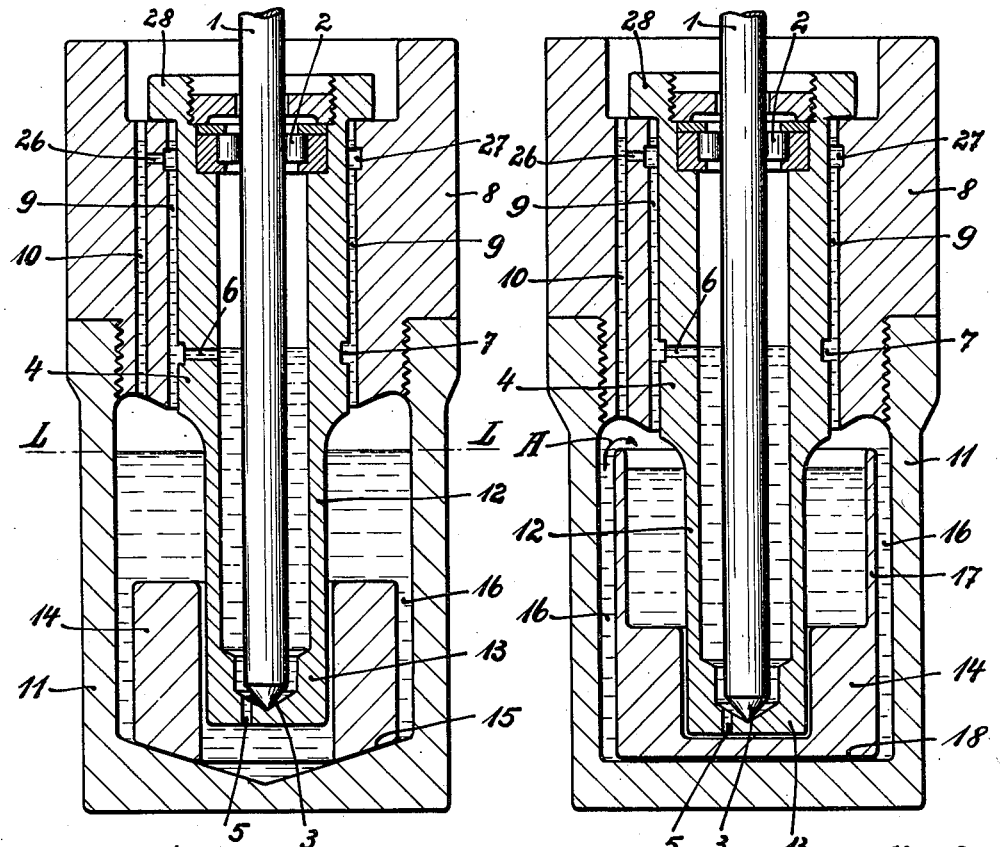
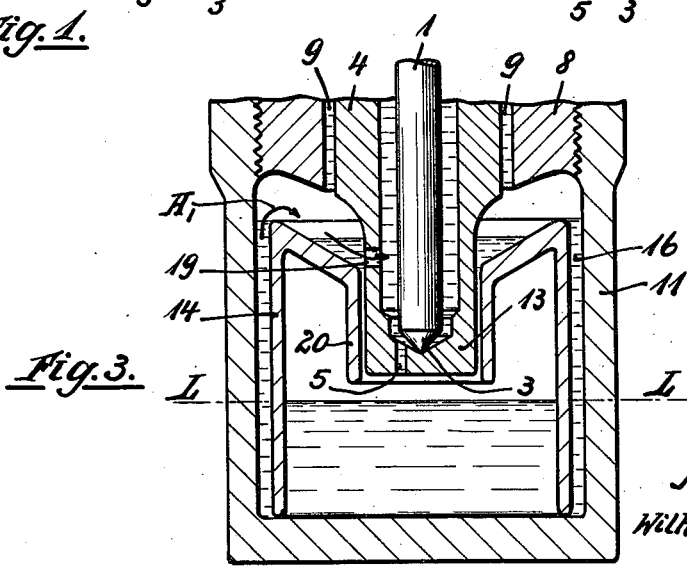
Inventor
Wilhelm Stahlecker Patented Mar. 17, 1936

2,034,670

UNITED STATES PATENT OFFICE 2,034,670

FLOATING BEARING

Wilhelm Stahlecker, Cannstatt, Germany, assignor to Vereinigte Kugellagerfabriken Aktiengesellschaft, Stuttgart-Bad-Cannstatt, Germany, a corporation of Germany Application May 9, 1934, Serial No. 724,726
In Germany May 19, 1933

5 Claims. (Cl. 308—169)

My invention relates to floating bearings of the kind described in the application for patent of the United States filed March 12, 1930, by Julius Raible, Serial No. 433,214, which has issued as Patent No. 1,964,140 and more particularly to improvements in the damping means forming part of such bearings.

The bearing disclosed in said patent application comprises a casing, at whose bottom is provided a well for the reception of a damping liquid, such as oil, and a bearing sleeve arranged in the casing with a clearance so as to be free to move radially within the clearance. The bearing sleeve is equipped with an antifriction bearing at the top and a normal bearing at the bottom, and a shaft is mounted to rotate in the bearings. This is the "flexible" arrangement which is provided for spindles or shafts in textile machinery, and which requires damping. Damping is effected according to the said patent application by circulating the damping liquid from the well in the space defined by the shaft and the sleeve and in the clearance without involving the antifriction bearing at the top of the sleeve, the damping liquid being supplied to the lower end of the clearance and raised by the movement of the bearing sleeve under the influence of the vibrations of the shaft or spindle in the sleeve.

This arrangement involves certain difficulties if the shaft or spindle is vertical and the vertical distance between the antifriction bearing and the normal bearing, and consequently the bearing sleeve itself, is long, as may be required for a shaft or spindle on which acts a great tilting moment or for some other reason. In such cases the requirement of flexibility on the one hand, and of efficient damping on the other hand, conflict, as capillary action is relied on for circulating the damping liquid in the clearance, and therefore the width of the clearance is limited, while, on the other hand, the clearance must obviously be the wider, the longer it is, in order to permit the axis of the shaft, and the bearing sleeve to assume the angular positions required with consideration of flexibility, without being interfered with by the casing. Beyond a certain width of the clearance, its capillary action ceases altogether. Under such conditions, it may occur that the upper portion of the clearance is not supplied with damping liquid to the extent required, or not as rapidly as required, and that, upon starting the shaft or spindle, the damping action is not effective enough when the first critical range is overstepped. This failure of the supply to the upper portion of the clearance is the more un-
desirable, as it occurs in a spindle which requires ample damping on account of the long vertical distance of its bearings from each other.

It might appear that the difficulty can be overcome by raising the level of the liquid in the well in the bottom of the casing, so that the casing is completely filled with the liquid and the liquid rises to a correspondingly higher level in the clearance when the spindle is rotated. It has, however, been found, that liquid is expelled from the upper end of the clearance until an air space has been formed in the well, and the liquid returns to the level from which it has been raised.

It is an object of my invention to so design a floating bearing of the kind described that the difficulties involved by long bearing sleeves are overcome.

To this end, I provide, in the well at the bottom of the casing, a movable bearing block which is operatively connected to the sleeve so as to partake in its movement under the influence of vibration, and which defines a clearance with the inner wall of the casing, like the bearing sleeve. The movement of this block exerts a pumping and whirling action on the damping liquid and thereby supplies liquid to the lower end of the clearance between the sleeve and the casing. By these means, the clearance in which the damping liquid circulates, is subdivided into two individual clearances, one between the sleeve and the inner wall of the casing, as in the said patent, and the other between the bearing block and the inner wall of the casing. The members defining the two individual clearances may be spaced apart vertically as far as required with consideration of the tilting moment, while the length of each individual clearance is determined as required with consideration of the capillary action. In other words, the added length of the individual clearances becomes independent of the length of the bearing sleeve and the clearance between the sleeve and the casing need not be wider than is compatible with efficient capillary action.

In the drawing affixed to this specification and forming part thereof, floating bearings embodying my invention are illustrated diagrammatically by way of example.

In the drawing,

Fig. 1 is an axial section of a bearing with a plain annular bearing block,

Fig. 2 is an axial section of a bearing whose bearing block is equipped with a cup at its top, for the reception of a portion of the damping liquid, and Fig. 3 is an axial section of the lower end of a bearing whose bearing block is an inverted cup, with its rim immersed in the damping liquid in the well.

Referring now to the drawing, and first to Fig. 1, the floating bearing is substantially similar to the bearing illustrated in Fig. 1 of the said patent. 1 is the shaft or spindle whose vibrations or oscillations are to be damped, 4 is the bearing sleeve in which the shaft is mounted for rotation and spaced from its inner wall, 2 is a radial antifriction bearing, here shown as a roller bearing, at the top of the sleeve 4, and 13 is a normal step bearing at the bottom of the sleeve in which bearing the pointed end 3 of the shaft 1 is supported. The upper end of the bearing sleeve 4 is equipped with a flange 28 which bears on a shoulder in the casing 8 so that the sleeve is free to move radially in a bore of the casing which, with the outer wall of the sleeve 4, defines the clearance 9 for circulating the damping liquid.

A cap 11 is screwed on, or otherwise secured to, the lower end of the casing 8 so as to form the well for the damping liquid or oil whose level is L—L. The lower end 12 of the sleeve 4 which projects into the cap 11, is reduced and enters the bore in an annular bearing block 14 whose lower face is conical and bears on a conical seat 15 on the bottom of the cap 11.

The circulating duct is designed as described in the said patent. The oil is lifted from the well in the cap 11 through a passage 5 in the step bearing 13 and raised to the level of passage 6 in the sleeve 4 by the rapid rotation of the shaft 1. The passage, which prevents rising of the oil as far as the antifriction bearing 2, is connected to an annular groove 7 in the outer wall of the sleeve 4, and, through the groove, to the clearance 9 between the sleeve and the casing 8. In the clearance, the oil is forced upwards by the formation of the "crescent" in the clearance, as described in the said patent, and by capillary action, and is discharged near the top of the clearance 9 through a groove 27, a radial passage 26, and a vertical passage 10 which returns it to the well in the cap 11. A portion of the oil descends by gravity at the outer end of passage 6 and is returned to the well directly through the lower end of the clearance 9, but the major portion is forced up toward the passage 26.

If the clearance 9 were substantially as long as the vertical distance between the bearings 2 and 3, as it is in the said patent, and it were necessary to make this distance very long, the clearance 9, with consideration of the required flexibility, would have to be made so wide that the limit width required for capillary action would be overstepped, resulting in insufficient supply of damping liquid, and ineffective damping. This is particularly unfavorable as a long bearing sleeve obviously requires particularly effective damping.

It will appear that the clearance between the reduced end 12 of the sleeve 4 and the bore in the block 14 is only slight so that the block partakes in the movement of the sleeve, while the clearance 16 between the block and the inner wall of the cap 11 is wider. The comparatively short length of the clearance 9 is made up for by the additional clearance 16 between the block 14 and the sleeve 4. The flexibility thus obtained is sufficient for the long bearing sleeve while the clearance 9 may be as narrow as required for efficient capillary action.

The oil level L—L is raised in the well by the dispelling action of the block 14 so that a portion of the oil in the well is projected into the lower end of the clearance 9 by the pumping and whirling action of the block.

Referring now to Fig. 2, the block 14 is arranged in the cap 11 as described, but a cup 17 is placed on top of the block, for the reception of the oil. The clearance 16 now extends upwards as far as the cup, and to a very short distance from the lower end of the clearance 9, so that the oil which is expelled from the clearance 16, is projected toward the lower end of the clearance 9, as indicated by the arrow A.

The lower face of the block 14 is flat and slides on the flat bottom 18 of the cap, and its bore does not extend down to the lower face of the block, i. e. the bore is closed at the bottom. Obviously, however, the block might be designed as illustrated in Fig. 1, with a conical lower face and an open bore.

Referring now to Fig. 3, the block 14 has the shape of an inverted cup. The oil level is at L—L and the rim of the block is immersed in the oil. The top of the block is dished and has a central sleeve 20 for the reception of the step bearing 13 on the sleeve 4. The oil which is expelled from the clearance 16, collects in the dished top of the block and is admitted into the sleeve 4 through a radial bore, or bores, 19, as indicated by the arrows A₁. The bore, or bores, 19 may be connected to a groove (not shown) like the grooves 7 and 27.

The improvements achieved by my invention are as follows:

1. Subdivision of the means for supporting the sleeve 4 into the clearance 9 and the block 14, particularly if the distance between the bearings 2 and 13 is long, so as to obtain an efficient capillary clearance 9 and, at the same time, the required flexibility;

2. Elevation of the oil level L—L by the bearing block 14, so as to bring the oil nearer to the lower end of clearance 9;

3. Utilization of block 14 for projecting the oil toward the lower end of clearance 9 by the pumping and whirling action of the block in the clearance 16.

I wish it to be understood that I do not desire to be limited to the exact details of construction shown and described for obvious modifications will occur to a person skilled in the art.

In the claims affixed to this specification no selection of any particular modification of the invention is intended to the exclusion of other modifications thereof and the right to subsequently make claim to any modification not covered by these claims is expressly reserved.

I claim:—

1. A floating bearing comprising a casing, a well for the reception of a damping liquid in the bottom of said casing, a bearing sleeve arranged in said casing with a clearance and fitted to move radially within said clearance; an anti-friction bearing arranged near the top, a plain bearing arranged near the bottom of said sleeve, a shaft mounted to rotate in said bearings and spaced apart from the inner wall of said sleeve, the shaft and sleeve comprising means for effecting a continuous circulation of the liquid from said well to the space defined by said shaft and the inner wall of said sleeve, and through said clearance, back to said well, a bearing block arranged in said well with a clearance with respect to the inner wall of the well, and operatively connected to said sleeve so as to move with said sleeve as said shaft vibrates, a collector in the upper portion of said block for the reception of liquid from the clearance between said block and the inner wall of the well, and means for connecting said collector to the space defined by said shaft and the inner wall of said sleeve.

2. A floating bearing comprising a casing, a well for the reception of a damping liquid in the bottom of said casing, a bearing sleeve arranged in said casing with a clearance and fitted to move radially within said clearance, an anti-friction bearing arranged near the top, a plain bearing arranged near the bottom of said sleeve, a shaft mounted to rotate in said bearings and spaced apart from the inner wall of said sleeve, the shaft and sleeve comprising means for effecting a continuous circulation of the liquid from said well to the space defined by said shaft and the inner wall of said sleeve, and through said clearance, back to said well, an inverted cup-shaped bearing block arranged in said well with a clearance with respect to the inner wall of said well, its lower rim extending below the liquid level in said well, which block is operatively connected to said sleeve so as to move with said sleeve as said shaft vibrates, a collector in the upper portion of said block for the reception of liquid from the clearance between said block and the inner wall of the well, and means for connecting said collector to the space defined by said shaft and the inner wall of said sleeve.

3. The combination with a vertical shaft, of a bearing sleeve, an anti-friction bearing disposed within such sleeve near its top, a plain bearing being formed within the sleeve near the lower part, the shaft being mounted on the said bearings and spaced apart from the inner wall of the sleeve, a casing surrounding the sleeve, the lower portion of the casing being formed as a well for containing damping fluid, there being a supply of damping fluid therein, the sleeve at its upper portion being formed to present a clearance space within the casing sufficiently short to favor capillary action throughout the length of such clearance for raising damping fluid incident to the formation of the crescent upon oscillation of the shaft, the outer diameter of the sleeve at its lower part being less than at the upper part, and a bearing block disposed in said well with a clearance space with respect to the inner wall thereof, such block being operatively connected to the lower part of the sleeve so as to move therewith as the shaft oscillates and exerting a pumping action on the damping fluid, forcing some of it into the lower end of the clearance space between the upper part of the sleeve and the casing, the organization being such that the clearance in which the damping fluid is circulated is subdivided vertically into two individual clearances.

4. The combination with a vertical shaft, of a bearing sleeve, an anti-friction bearing disposed within such sleeve near its top, a plain bearing being formed within the sleeve near the lower part, the shaft being mounted on the said bearings and spaced apart from the inner wall of the sleeve, a casing surrounding the sleeve, the lower portion of the casing being formed as a well for containing damping fluid, there being a supply of damping fluid therein, the sleeve at its upper portion being formed to present a clearance space within the casing sufficiently short to favor capillary action throughout the length of such clearance for raising damping fluid incident to the formation of the crescent upon oscillation of the shaft, the outer diameter of the sleeve at its lower part being less than at the upper part, and a bearing block disposed in said well with a clearance space with respect to the inner wall thereof, such block being operatively connected to the lower part of the sleeve so as to move therewith as the shaft oscillates and exerting a pumping action on the damping fluid forcing some of it into the lower end of the clearance space between the upper part of the sleeve and the casing, the upper part of said bearing block being of cup formation for forcing the liquid toward the said lower end of the clearance between said sleeve and said casing, the organization being such that the clearance in which the damping fluid is circulated is subdivided vertically into two individual clearances.

5. The combination with a vertical shaft, of a bearing sleeve, an anti-friction bearing disposed within such sleeve near its top, a plain bearing being formed within the sleeve near the lower part, the shaft being mounted on the said bearings and spaced apart from the inner wall of the sleeve, a casing surrounding the sleeve, the lower portion of the casing being formed as a well for containing damping fluid, there being a supply of damping fluid therein, the sleeve at its upper portion being formed to present clearance space within the casing sufficiently short to favor capillary action throughout the length of such clearance for raising damping fluid incident to the formation of the crescent upon oscillation of the shaft, the outer diameter of the sleeve at its lower part being less than at the upper part, and a bearing block disposed in said well with a clearance space with respect to the inner wall thereof, such block being operatively connected to the lower part of the sleeve so as to move therewith as the shaft oscillates and exerting a pumping action on the damping fluid forcing some of it into the lower end of the clearance space between the upper part of the sleeve and the casing, the upper portion of said bearing block and extending upwards into the vicinity of the lower end of the clearance between said sleeve and said casing, the organization being such that the clearance in which the damping fluid is circulated is subdivided vertically into two individual clearances.

WILHELM STAHLECKER.